Patented Jan. 9, 1951

2,537,337

UNITED STATES PATENT OFFICE 2,537,337

ALKYLATION OF PHENOLS

James Edgar Fearey, Norton-on-Tees, England, assignor to Imperial Chemical Industries Limited, a corporation of Great Britain No Drawing. Application May 6, 1947, Serial No. 746,327. In Great Britain May 17, 1946

6 Claims. (Cl. 260—624)

This invention relates to the alkylation of phenols.

It has already been proposed to alkylate phenols by reacting at elevated temperatures unsaturated hydrocarbons such as isobutylene, amylene and their dimers and trimers with a phenol in the presence of a strongly acid catalytic material, such as phosphoric acid, sulphuric acid and aliphatic or aromatic sulphonic acids.

The present invention provides an improved process for the alkylation of a compound selected from phenol and cresols comprising reacting the said compound with an aliphatic mono-olefine in the presence of a strongly acidic catalyst and in the presence of not more than 0.24 part by weight of water per part by weight of anhydrous catalyst as herein defined. Preferably a strong acid is used.

We have found that by carrying out the alkylation in the presence of only small proportions of water, an improvement in the process is obtained by way of increased yields of alkylated product and/or an increased rate of reaction for a given set of conditions. Whilst the invention is not restricted to the use of acid of 100% strength, for the purpose of definition, the ratio of total water present from the reactants and the reaction of acid with phenol or cresol to free acid of 100% strength should preferably be not more than 0.1 part by weight of water to 1 part by weight of acid and in any case not more than 0.24 part by weight of water to 1 part by weight of acid. More preferably the reaction is conducted under substantially anhydrous conditions.

The invention is applicable to the alkylation of phenol itself or ortho-cresol, or meta-cresol, or para-cresol, whether present singly or in admixture with one another or with other compounds.

Although the invention has been found to be particularly advantageous when using olefines containing 5 to 8 carbon atoms, especially the octenes, olefines generally may be employed both in the liquid and gaseous phase. Preferably the olefine is a tertiary olefine. Dimers of butylene are suitable octenes.

Strongly acidic catalysts suitable for use according to the process of the present invention are sulphuric acid, fuming sulphuric acid, aromatic sulphonic acids, in particular phenol sulphonic acids, cresol sulphonic acids, and p-toluene sulphonic acid. In the case of the sulphonic acids the aforesaid ratio is calculated on the amount of sulphuric acid ($H_2SO_4$) equivalent to the $SO_3$ content of the sulphonic acid. With oleum the ratio is based on the total equivalent $H_2SO_4$. The effective acidic catalyst preferably amounts to 3% to 15% by weight of the phenol or cresol reacted. Below 3% the reaction tends to be slow, whilst above 15% the amount of acid used becomes uneconomic.

The reactants may be dried by any convenient means, for example by distillation or with water-absorbing materials, or by a combination of such methods as desired. Similar methods may also be used to dry the olefines to be used in the process. When using oleum it is frequently unnecessary to remove water by distillation or otherwise since the oleum is capable of taking up larger quantities of water.

While temperatures of 20°–80° C. are suitable it is preferred to operate at a temperature below 30° C.

The following examples in which all parts except yields are by weight, illustrate the advantages obtained when operating according to the present invention. Yields are expressed as molar percent.

Example 1

Commercial crystal phenol containing 0.3% of water was reacted in equivalent proportion with di-isobutylene containing 0.06% of water in the presence of a catalyst comprising sulphuric acid of 98% strength and amounting to 10% of the phenol used. The temperature was kept between 20° and 25° C. and the percentage of unreacted phenol in the reaction product after seven days was found to be 4%.

If, however, the phenol contained water to the extent of 2.3% and 3.3%, the percentages of unreacted phenol in the reaction products after a similar reaction time of seven days were 14% and 20% respectively, indicating reductions in the yield of desired product of 25% and 40% respectively.

Example 2

A cresol sulphonic acid for use as a catalyst was prepared by mixing equimolecular proportions of a commercial cresylic acid containing the meta and para isomers and a 0.25% water content, with concentrated sulphuric acid of 98% strength. 25 gms. of this catalyst were mixed with 300 gms. of commercial cresylic acid and the mixture distilled at 120° C. and under 20 mms. pressure of mercury, whereby 63 gms. of a distillate containing 3.0 gms. of water were removed. 474 gms. of a butene dimer containing several isomeric octenes and a water content of 0.1% were dried over anhydrous calcium chloride and added slowly, while stirring, to the mixture of cresylic acid containing the cresol sulphonic acid. The time taken for the additions was 20 minutes, during which time the temperature rose to 40° C. The mixture was stirred for a further 16 hours and during this time was allowed to cool to 15° C. The mixture was washed with 1 litre of a 10% aqueous caustic soda solution and then with 1 litre of water, after which it was steam distilled in the presence of about 0.2% by weight of caustic soda, the temperature being finally raised to 160° C. whereby an oily layer amounting to 217.5 gms. was obtained. The residue amounting to 446 gms. was dried by means of anhydrous sodium sulphate whereby 417 gms. of a clear reddish brown liquid having a density of 0.940 at 15° C. were obtained, which consisted essentially of octyl cresols, representing a yield of 86% based on the cresylic acid initially available, of which, 90% was consumed.

The preparation of octyl cresols was repeated, except that no drying of the reactants was undertaken. In this case the yield was only 61%, based on the cresylic acid initially available, of which 61% was consumed.

Example 3

The preparation of octyl cresols was repeated several times for various reaction times using however a mixture of 2:4:4-trimethyl pentene-1 and 2:4:4-trimethyl pentene-2, instead of the butene dimer mentioned in Example 2. For the purpose of comparison a parallel set of preparations was carried out, without however drying the reactants. The results obtained were as follows:

| Time of reaction | Percentage yield | |
| --- | --- | --- |
| | Dry Reactants | Undried reactants |
| Hours | | |
| 0.5 | 65 | 44.5 |
| 1.0 | 75 | 59.5 |
| 2.5 | 78.5 | 71.0 |

Example 4

The catalyst was prepared by using fuming sulphuric acid of 20% strength in place of the sulphuric acid. The conditions as to weights and types of reactants used were otherwise the same as in Example 2, with the exception that no removal of water by distillation was effected. The yield of octyl cresols amounted to 72% based on the cresylic acid initially available.

From the above examples it will be seen that for a given reaction time a considerably improved yield of alkylated phenols is obtained by drying the reactants or by using fuming sulphuric acid.

I claim:

1. A process for the alkylation of a compound selected from the group consisting of phenol and cresols in which the said compound is reacted with an aliphatic mono-olefin in the presence of a catalyst which is the reaction product of a portion of the compound to be alkylated and concentrated sulfuric acid, the compound to be alkylated, the olefin, and the said reaction product catalyst being treated for the removal of water prior to the alkylation reaction so that less than 0.24 parts by weight of water are present per part by weight of equivalent sulfuric acid.

2. A process as set forth in claim 1 when carried out under anhydrous conditions.

3. A process as set forth in claim 1 wherein the aliphatic mono-olefin is one containing from 5 to 8 carbon atoms.

4. A process as set forth in claim 1 wherein a tertiary olefin is employed.

5. A process as set forth in claim 1 wherein the olefin is a dimer of butylene.

6. A process as set forth in claim 1 wherein a proportion of catalyst is from 3 to 15% by weight of the compound selected from the group consisting of phenol and cresols based on equivalent sulfuric acid.

JAMES EDGAR FEAREY.

REFERENCES CITED

The following references are of record in the file of this patent:

UNITED STATES PATENTS

| Number | Name | Date |
| --- | --- | --- |
| 2,008,017 | Hester | July 16, 1935 |
| 2,149,759 | Cantrell | Mar. 7, 1939 |
| 2,259,723 | Ballard et al. | Oct. 21, 1941 |
| 2,286,504 | Parker | June 16, 1942 |
| 2,423,470 | Simons | July 8, 1947 |
| 2,429,622 | Hirsch | Oct. 28, 1947 |